United States Patent
Wu et al.

(10) Patent No.: US 9,810,953 B2
(45) Date of Patent: Nov. 7, 2017

(54) LCD PANEL AND METHOD FOR MANUFACTURING THE SAME

(75) Inventors: Jo Shan Wu, Guangdong (CN); Kuancheng Lee, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 278 days.

(21) Appl. No.: 13/636,651

(22) PCT Filed: Jun. 21, 2012

(86) PCT No.: PCT/CN2012/077308
§ 371 (c)(1),
(2), (4) Date: Sep. 21, 2012

(87) PCT Pub. No.: WO2013/185373
PCT Pub. Date: Dec. 19, 2013

(65) Prior Publication Data
US 2013/0335691 A1    Dec. 19, 2013

(30) Foreign Application Priority Data
Jun. 15, 2012    (CN) .......................... 2012 1 00199235

(51) Int. Cl.
*G02F 1/1339*    (2006.01)
(52) U.S. Cl.
CPC ........ *G02F 1/13394* (2013.01); *G02F 1/1339* (2013.01); *G02F 1/13392* (2013.01); *G02F 2001/13398* (2013.01)

(58) Field of Classification Search
CPC ............. G02F 1/13392; G02F 1/13394; G02F 2001/13396; G02F 1/1339
USPC .................................................. 349/155–156
See application file for complete search history.

(56) References Cited

U.S. PATENT DOCUMENTS

| | | | |
|---|---|---|---|
| 6,989,883 B2 * | 1/2006 | Park et al. .................... | 349/155 |
| 7,502,090 B2 * | 3/2009 | Oh et al. ....................... | 349/156 |
| 7,961,287 B2 * | 6/2011 | Kim ..................... | G02F 1/13394 349/141 |
| 8,724,071 B2 * | 5/2014 | Hashimoto ................... | 349/156 |
| 2003/0193640 A1 * | 10/2003 | Park et al. .................... | 349/155 |
| 2006/0290857 A1 * | 12/2006 | Yang ................. | G02F 1/13394 349/129 |
| 2007/0070286 A1 | 3/2007 | Cho et al. | |

FOREIGN PATENT DOCUMENTS

| | | |
|---|---|---|
| CN | 2862107 Y | 1/2007 |
| CN | 1940659 A | 4/2007 |
| CN | 101071210 A | 11/2007 |
| CN | 101071220 A | 11/2007 |

(Continued)

*Primary Examiner* — Dung Nguyen
(74) *Attorney, Agent, or Firm* — Muncy, Geissler, Olds & Lowe, P.C.

(57) ABSTRACT

The present invention discloses a liquid crystal display (LCD) panel, which includes an array substrate; a color filter (CF) substrate disposed opposite to the array substrate; and a spacer disposed between the array substrate and the CF substrate. The spacer includes a columnar platform and a recessed platform, and the columnar platform and the recessed platform engage each other. The present invention further discloses a method for manufacturing the LCD panel.

7 Claims, 4 Drawing Sheets

(56) References Cited

FOREIGN PATENT DOCUMENTS

| | | | |
|---|---|---|---|
| CN | 101625470 A | | 1/2010 |
| KR | 10-0640217 B1 | | 10/2006 |
| KR | 2008 0048333 | * | 6/2008 |
| KR | 10-2008-0110060 A | | 12/2008 |

* cited by examiner

LCD PANEL AND METHOD FOR MANUFACTURING THE SAME

FIELD OF THE INVENTION

The present invention relates to a liquid crystal display (LCD) technology, and especially to an LCD panel and a method for manufacturing the same.

BACKGROUND OF THE INVENTION

A conventional LCD panel includes a color filter (CF) substrate, an array substrate, and liquid crystals. The CF substrate includes a first glass substrate, a black matrix (BM) layer, a color-pattern layer, and a transparent electrode (indium tin oxide, ITO) layer. All of the first glass substrate, the BM layer, the color-pattern layer, and the transparent electrode layer are laminated into one body in sequence. The array substrate includes a second glass substrate, a gate line layer, an insulative layer, a semiconductor layer, a metal layer, and a passivation layer. All of the second glass substrate, the gate line layer, the insulative layer, the semiconductor layer, the metal layer, and the passivation layer are laminated into one body in sequence.

The CF substrate and the array substrate of the conventional. LCD panel are spaced out by spacers (photo spacers). The CF substrate and the array substrate are laminated and assembled together; moreover; a gap exists because the spacers are disposed therebetween. The liquid crystals are disposed in the gap. While contact area between the spacers and the array substrate is too large, a friction area is also large. Because the spacers sustain a larger friction, it is easy to cause a touch defect. Thus, the LCD panel is not easy to recover after the touch.

The conventional spacers are located on thin-film transistors. The spacers exert a force on the thin-film transistors when the spacers are given a force. That is likely to damage the thin-film transistors, such that a partial region of the LCD panel can not display images correctly.

The typical LCD panel is disposed vertically for utilization. When the LCD panel expands by heat and an elasticity of the spacers therein is inadequate, the liquid crystals flow downward due to an action of gravitation, such that a defect appears during the display. In addition, when the LCD panel is subjected to a compression test to determine endurance thereof, a predetermined pressure is applied on a specific region of the LCD panel. The spacers may be crushed due to the inadequate elasticity of the spacers, resulting in a defect of impressed spots.

SUMMARY OF THE INVENTION

An objective of the present invention is to provide an LCD panel, which can prevent thin-film transistors or pixel electrodes from damage when a user touches the LCD panel, and can make the LCD panel quickly recover after the touch, thereby ensuring a stable display quality.

To achieve the foregoing objective, the present invention provides an LCD panel, which includes: an array substrate; a CF substrate disposed opposite to the array substrate; and a spacer disposed between the array substrate and the CF substrate. The spacer includes a columnar platform and a recessed platform, and the columnar platform and the recessed platform engage each other. The columnar platform is disposed on one side of the array substrate, and the recessed platform is disposed on one side of the CF substrate. The columnar platform is located on a gate line of the array substrate. The columnar platform is formed on the array substrate by a halftone exposure process. The recessed platform is formed on the CF substrate by a halftone exposure process.

In the above-mentioned LCD panel, the columnar platform is further disposed on the CF substrate, and the recessed platform is further disposed on the array substrate.

In the above-mentioned LCD panel, the recessed platform is located on a gate line of the array substrate.

In the above-mentioned LCD panel, a shape of a top surface of the columnar platform fits a shape of a concave surface of the recessed platform.

In the above-mentioned LCD panel, an area of the concave surface of the recessed platform is larger than an area of the top surface of the columnar platform.

Another objective of the present invention is to provide an LCD panel, which can prevent thin-film transistors or pixel electrodes from damage when a user touches the LCD panel, and can make the LCD panel quickly recover after the touch, thereby ensuring a stable display quality.

To achieve the foregoing objective, the present invention provides an LCD panel, which includes: an array substrate; a CF substrate disposed opposite to the array substrate; and a spacer disposed between the array substrate and the CF substrate, the spacer comprising a columnar platform and a recessed platform, the columnar platform and the recessed platform engaging each other.

In the above-mentioned LCD panel, the columnar platform is disposed on one side of the array substrate, and the recessed platform is disposed on one side of the CF substrate.

In the above-mentioned LCD panel, the columnar platform is located on a gate line of the array substrate.

In the above-mentioned LCD panel, the columnar platform is disposed on one side of the CF substrate, and the recessed platform is disposed on one side of the array substrate.

In the above-mentioned LCD panel, the recessed platform is located on a gate line of the array substrate.

Yet another objective of the present invention is to provide a method for manufacturing an LCD panel, which can prevent thin-film transistors or pixel electrodes from damage when a user touches the LCD panel, and can make the LCD panel quickly recover after the touch, thereby ensuring a stable display quality.

To achieve the foregoing objective, the present invention provides a method for manufacturing an LCD panel. The method includes the following steps of: (A) using a halftone exposure process to form a recessed platform on a first substrate; (B) using a halftone exposure process to form a columnar platform on a second substrate; (C) assembling and laminating the first substrate and the second substrate, wherein the columnar platform and the recessed platform engage each other; and (D) filling liquid crystals between the first substrate and the second substrate.

In the above-mentioned method for manufacturing the LCD panel, the first substrate is a color filter (CF) substrate, and the second substrate is an array substrate.

In the above-mentioned method for manufacturing the LCD panel, the array substrate includes a pixel electrode, a thin-film transistor, a data line, and a drain line. The method further includes the following step of: (E) forming the columnar platform on a gate line of the array substrate in one of forming processes of the pixel electrode, the thin-film transistor, the data line, and the drain line of the array substrate.

In the above-mentioned method for manufacturing the LCD panel, the first substrate is an array substrate, and the second substrate is a CF substrate.

In the above-mentioned method for manufacturing the LCD panel, the array substrate includes a pixel electrode, a thin-film transistor, a data line, and a drain line. The method further includes the following step of: (F) forming the recessed platform on a gate line of the array substrate in one of forming processes of the pixel electrode, the thin-film transistor, the data line, and the drain line of the array substrate.

In the present invention, because the columnar spacer is disposed above the gate line and/or the data line, the spacer does not exert a force on the thin-film transistor or the pixel electrode to damage then when the spacer are given a force in comparison with the prior art. This is an advantage for ensuring the stable display quality. In addition, the columnar spacer includes the columnar platform and the recessed platform, and the columnar spacer consists of the columnar platform and the recessed platform that engage each other. Therefore, after the array substrate and the CF substrate that have the columnar platform and the recessed platform disposed thereon are assembled and laminated, the columnar spacer consisting of the columnar platform and the recessed platform is capable of restricting a slide region of the array substrate and the CF substrate, thereby preventing the partial region of the LCD panel form sliding and shifting without recovery to decrease the display quality of the LCD panel after the user touches the LCD panel. Meanwhile, the columnar spacer of the present invention consists of two portions, the columnar platform and the recessed platform. A combination of both can increase the elasticity and the resist pressure of the columnar spacer It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
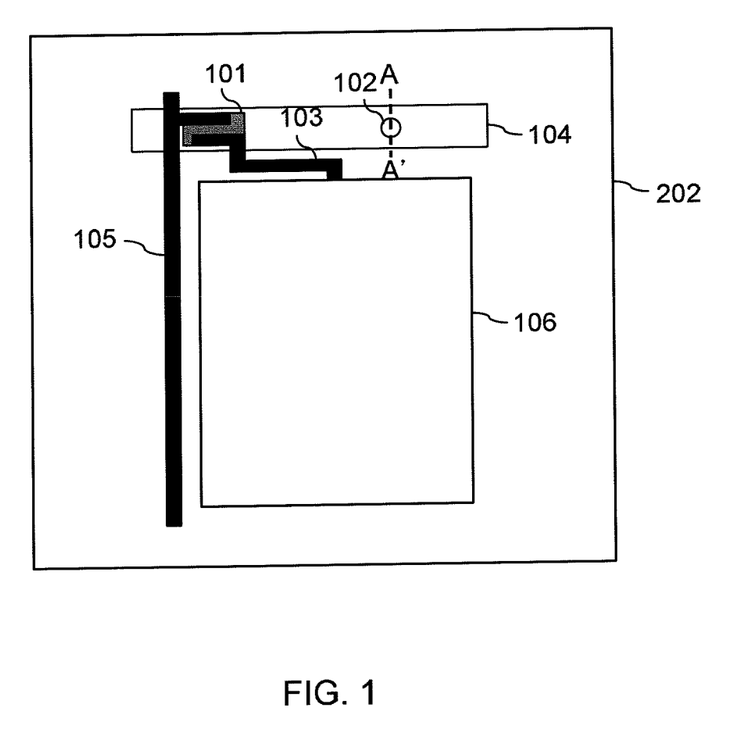
FIG. 1 is a schematic drawing illustrating a position of a spacer in an LCD panel of the present invention.

Referring to FIG. 1, FIG. 1 is a schematic drawing illustrating a position of a spacer 102 in an LCD panel of the present invention. To observe the LCD panel of the present invention in a top view, as shown in FIG. 1, the array substrate 202 of the present invention has a gate line 104, a data line 105, a thin-film transistor 101, a drain line 103, and a pixel electrode 106. The spacer 102 is located at the front of the gate line 104 of the array substrate 202 (to observe the LCD panel of the present invention in a top view). The spacer 102 of the present invention also can be located at the front of the data line 105.

In the LCD panel of the present invention, the spacer 102 is positioned above the gate line 104 (in a cross-sectional view taken along line A-A') and/or above the data line 105. Hence, the spacer 102 does not exert a force on the thin-film transistor 10 or the pixel electrode 106 to damage them when the spacer 102 are given a force in comparison with the prior art. This is an advantage for ensuring a stable display quality.

Figure 2:
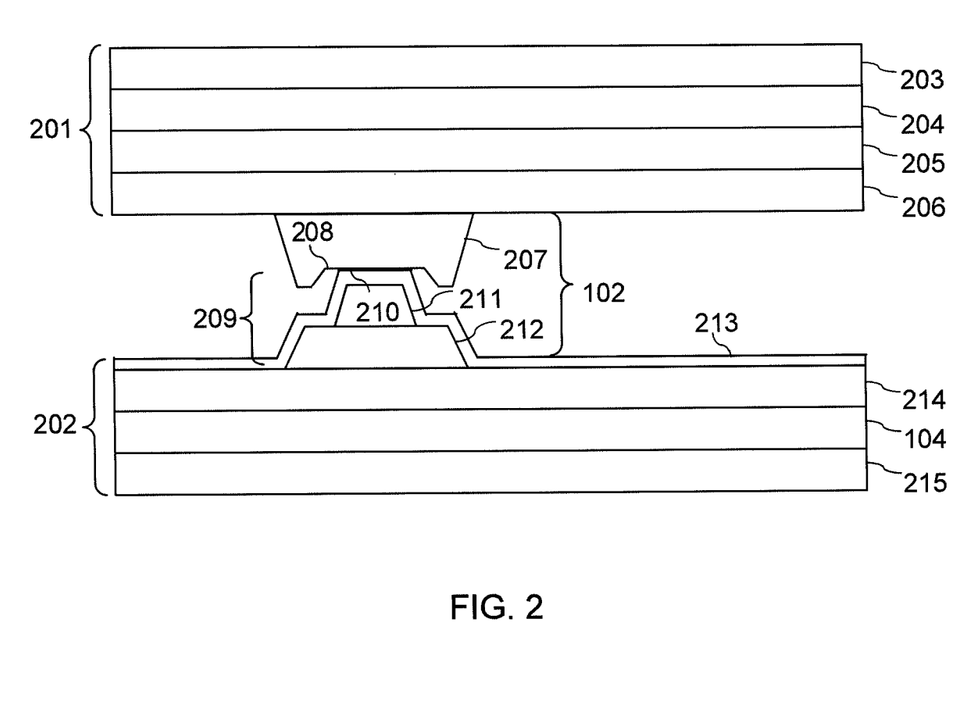
FIG. 2 is a cross-sectional view taken along line A-A' in FIG. 1 according to a first preferred embodiment.
Figure 3:
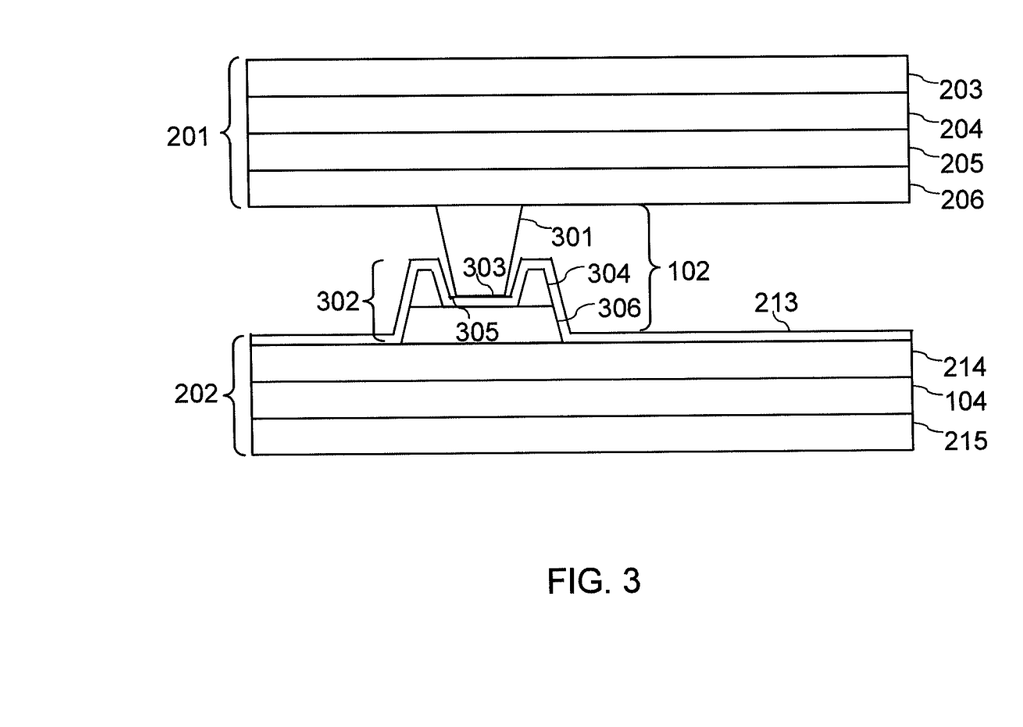
FIG. 3 is a cross-sectional view taken along line A-A' in FIG. 1 according to a second preferred embodiment.

FIG. 2 and FIG. 3 illustrate the spacer 102 being positioned above the gate line 104 exemplarily. Circumstances with regard to the spacer disposing on the data line 105 can be implemented by referring to the description of FIG. 2 and FIG. 3.

Referring to FIG. 2, FIG. 2 is a cross-sectional view taken along line A-A' in FIG. 1 according to a first preferred embodiment. In the embodiment, the LCD panel of the present invention includes a color filter (CF) substrate 201, the array substrate 202, the spacer 102, and liquid crystals (not shown). The CF substrate 201 and the array substrate 202 are laminated up and down to form a space. The spacer 102 is disposed 202 between the CF substrate 201 and the array substrate 202, and the liquid crystals are filled between the CF substrate 201 and the array substrate 202. The CF substrate 201 includes a first glass substrate 203, a BM layer 204, a color-pattern layer 205, and a transparent electrode layer 206. The array substrate 202 includes a second glass substrate 215, a gate line layer 104, an insulative layer 214, a semiconductor layer 212, a metal layer 211 and a passivation layer 213. The spacer 102 includes a columnar platform and a recessed platform. The columnar platform and the recessed platform are respectively disposed on two opposite sides of the array substrate and the CF substrate and engage each other, and/or the columnar platform and the recessed platform are respectively disposed on the two opposite sides of the CF substrate and the array substrate and engage each other. In the embodiment, the columnar platform is a first columnar platform 209, and the recessed platform is a first recessed platform 207. That is, in the embodiment, the spacer 102 includes the first columnar platform 209 and the first recessed platform 207. The first recessed platform 207 is disposed on the transparent electrode layer 206 of the CF substrate 201, and the first columnar platform 209 is disposed on the insulative layer 214 of the array substrate 202. The position of the first recessed platform 207 on the CF substrate 201 corresponds to the position of the first columnar platform 209 on the array substrate 202. The spacer 102 is a superimposed combination of the first recessed platform 207 and the first columnar platform 209. Specifically, the first recessed platform 207 has a concave surface 208, and the first columnar platform 209 has a top surface 210. A shape of the concave surface 208 fits a shape of the top surface 210. That is, the top of the first columnar platform 209 can be disposed into the recess of the first recessed platform 207. The concave surface 208 of the first recessed platform 207 fits the top surface 210 of the first columnar platform 209. An area of the concave surface 208 of the recessed platform 207 is larger than an area of the top surface 210 (after adding the passivation layer 213) of the columnar platform 209. The first recessed platform 207 and the first columnar platform 209 are inserted together (engage each other). Specifically, the first columnar platform 209 is inserted into the first recessed platform 207. The columnar platform is disposed on the gate line 104 of the array substrate 202. The first columnar platform 209 includes a passivation layer 213, a metal layer 211, and a semiconductor layer 212. The first columnar platform 209 is formed with the semiconductor layer 212 and the metal layer 211 by the processes of coating photoresist, pre-bake, exposure through a halftone mask, development, post-bake, etching, photoresist lift off, and so on.

Referring to FIG. 3, FIG. 3 is a cross-sectional view taken along line A-A' in FIG. 1 according to a second preferred embodiment. In the embodiment, the LCD panel of the present invention includes a color filter (CF) substrate 201, the array substrate 202, the spacer 102, and liquid crystals (not shown). The CF substrate 201 and the array substrate 202 are laminated up and down to form a space. The spacer 102 is disposed 202 between the CF substrate 201 and the array substrate 202, and the liquid crystals are filled between the CF substrate 201 and the array substrate 202. The CF substrate 201 includes a first glass substrate 203, a BM layer 204, a color-pattern layer 205, and a transparent electrode layer 206. The array substrate 202 includes a second glass substrate 215, a gate line layer 104, an insulative layer 214, a semiconductor layer 212, a metal layer 211 and a passivation layer 213. The spacer 102 includes a columnar platform and a recessed platform. In the embodiment, the columnar platform is a second columnar platform 301, and the recessed platform is a second recessed platform 302. That is, in the embodiment, the spacer 102 includes the second columnar platform 301 and the second recessed platform 302. The second columnar platform 301 and the second recessed platform 302 are respectively disposed on the two opposite sides of the array substrate 202 and the CF substrate 201 and engage each other, and/or the second columnar platform 301 and the second recessed platform 302 are respectively disposed on the two opposite sides of the CF substrate 201 and the array substrate 202 the and engage each other. The second columnar platform 301 is disposed on the transparent electrode layer 206 of the CF substrate 201, and the second recessed platform 302 is disposed on the insulative layer 214 of the array substrate 202. The position of the second columnar platform 301 on the CF substrate 201 corresponds to the position of the second recessed platform 302 on the array substrate 202. The spacer 102 is a superimposed combination of the second columnar platform 301 and the second recessed platform 302. Specifically, the second recessed platform 302 has a concave surface 305, and the second columnar platform 301 has a top surface 303. A shape of the concave surface 305 fits a shape of the top surface 303. That is, the top surface 303 of the second columnar platform 301 can be disposed into the recess of the second recessed platform 302. The top surface of the second columnar platform 301 fits the concave surface 305 of the second recessed platform 302. An area of the concave surface 305 (after adding the passivation layer 213) of the second recessed platform 302 is larger than an area of the top surface 303 of the second columnar platform 301. The second recessed platform 302 and the second columnar platform 301 are inserted together (engage each other). Specifically, the second columnar platform 301 is inserted into the second recessed platform 302. The recessed platform is disposed on the data line 105 of the array substrate 202. The second recessed platform 302 includes a passivation layer 213, a metal layer 304, and a semiconductor layer 306. The second recessed platform 302 disposed on the array substrate 202 is formed with the semiconductor layer 212 and the metal layer 211 by the processes of coating photoresist, pre-bake, exposure through a halftone mask, development, post-bake, etching, photoresist lift off, and so on.

In the first and second preferred embodiments, any one of the first columnar platform 209 and the second recessed platform 302 can be individually disposed on the array substrate 202, also both the first columnar platform 209 and the second recessed platform 302 can be disposed thereon. Any one of the first recessed platform 207 and the second columnar platform 301 can be individually disposed on the CF substrate 202, also both the first recessed platform 207 and the second columnar platform 301 can be disposed thereon. The positions of the first columnar platform 209 and the second recessed platform 302 on the array substrate 202 correspond to the positions of the first recessed platform 207 and second columnar platform 301 on the CF substrate 201.

Figure 4:
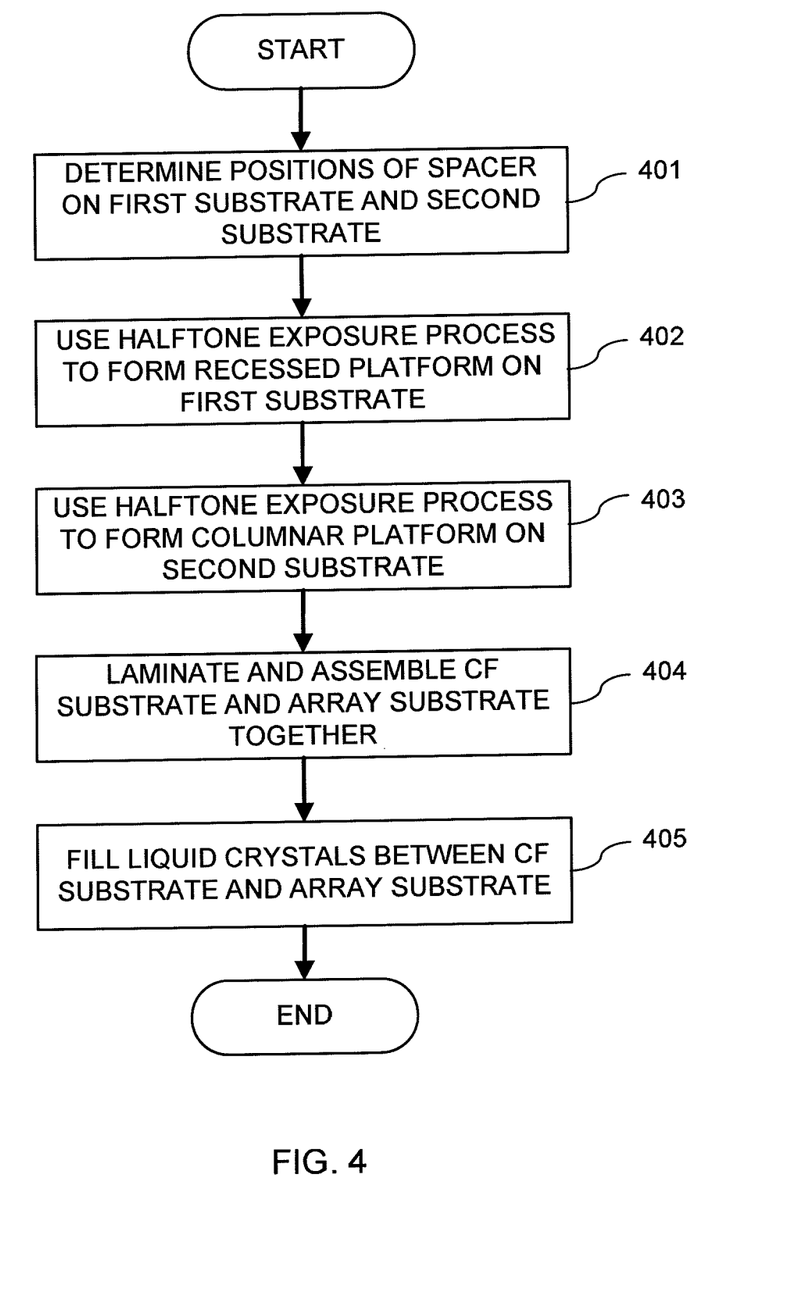
FIG. 4 is a flow chart illustrating a method for manufacturing the LCD panel of the present invention.

Referring to FIG. 4, FIG. 4 is a flow chart illustrating a method for manufacturing the LCD panel of the present invention. At step 401, the step is to determine (calculate) positions of the spacer 102 on the first substrate and the second substrate, that is, to determine (calculate) data with respect to a height of the first recessed platform 207, a depth, a shape, and a bottom area of the recess of the first recessed platform 207, the position of the first recessed platform 207 on the CF substrate 201, and so on and/or to determine (calculate) data with respect to a height of the second columnar platform 301, the area of the top surface, the position, and so on of the second columnar platform 301 on the CF substrate 201, and to determine (calculate) data with respect to a height, the area of the top surface, the position of the second columnar platform 301 on the array substrate 202, and so on and/or to determine (calculate) data with respect to a height of the second recessed platform 302, a depth, a shape, and a bottom area of the recess, the position of the second recessed platform 302 on the array substrate 202, and so on. The first columnar platform 209 and/or the position of the second recessed platform 302 are/is positioned on the gate line 104 and/or the data line 105 on the array substrate 202.

At step 402, the step is to use a halftone exposure process to form a recessed platform on the first substrate, which is a CF substrate. Actually, a columnar platform also can be formed on the CF substrate by the halftone exposure process. Specifically, to provide the first glass substrate 203, the BM layer 204, the color-pattern layer 205, and the transparent electrode layer 206 are disposed on the first glass substrate 203 in sequence. Then a spacer material layer is coated over the transparent electrode layer 206 and then the spacer material layer is processed by pre-baking, exposing through a halftone mask, developing by alkaline solution, post-baking, and so on, thereby forming the columnar platform and/or the recessed platform, so as to form the CF substrate 201. The specific step for forming the first recessed platform 207 and/or the second columnar platform 301 on the CF substrate 201 is the following. First, a spacer material layer is coated over the transparent electrode layer 206 of the CF substrate 201. A thickness of the spacer material layer is the calculated height of the first recessed platform 207 and/or the height of the second columnar platform 301. Then the spacer material layer is processed by pre-baking, exposing through a halftone mask, developing by alkaline solution, post-baking, and so on according to the calculated position of the first recessed platform 207 on the CF substrate 201, thereby forming a columnar platform. Then the columnar platform is processed by pre-baking, exposing through a halftone mask, developing by alkaline solution, post-baking, and so on according to the calculated depth, shape, and area of the recess of the first recessed platform 207, so that a recess is formed on the columnar platform, so as to form the first recessed platform 207; and/or the spacer material layer is processed by pre-baking, exposing through a halftone mask, developing by alkaline solution, post-baking, etc. on the CF substrate 201 according to the calculated area and shape of the top surface of the second columnar platform 301, so as to form the second columnar platform 301.

At step 403, the step is to use a halftone exposure process to form a columnar platform on the second substrate, which is the array substrate. Actually, a recessed platform also can be formed on the array substrate by the halftone exposure process. Specifically, a second glass substrate 215 is provided, and the gate line layer 104, the insulative layer 214, the semiconductor layer 212, and the metal layer 211 are disposed on the second glass substrate 215 in sequence. In the processes of disposing the semiconductor layer 212 and the metal layer 211, the semiconductor layer 212 and the metal layer 211 are processed by pre-baking, exposing through a halftone mask, developing by alkaline solution, post-baking, and so on. Then the passivation layer 213 is disposed on the semiconductor layer 212 and the metal layer 211 to form the recessed platform and/or the columnar platform, so as to form the array substrate 202. The specific step for forming the first columnar platform 209 and/or the second recessed platform 302 on the gate line 104 and/or the data line 105 of the array substrate 202 is the following. First, a semiconductor layer 212 and a metal layer 211 are respectively deposited on the insulative layer 214 of the array substrate 202, and the photoresist is coated thereon. The total thickness of the semiconductor layer 212 and the material layer is the calculated height of the first columnar platform 209 and/or the height of the second recessed platform 302. Then the semiconductor layer 212, the metal layer 211, and the photoresist layer are processed by pre-baking, exposing through a halftone mask, developing, post-baking, etching, photoresist lift off, and so on according to the calculated area and shape of the top surface of the first columnar platform 209, so as to form the first columnar platform 209; and/or the semiconductor layer 212, the metal layer 211, and the photoresist layer are processed by pre-baking, exposing through a halftone mask, developing, post-baking, etching, photoresist lift off, and so on according to the calculated position of the second recessed platform 302 on the array substrate 202, so as to form the a columnar platform. Then the columnar platform is processed by pre-baking, exposing through a halftone mask, developing, post-baking, etching, photoresist lift off, and so on according the calculated depth, shape, and area of the recess of the second recessed platform 302, so that a recess is formed on the columnar platform, so as to form the second recessed platform 302. The passivation layer 213 is deposited on one side of the array substrate 202 facing the CF substrate 201, i.e. the side that has the first columnar platform 209 and/or the second recessed platform 302. The step for forming the first columnar platform 209 and/or the second recessed platform 302 on the gate line 104 and/or the data line 105 of the array substrate 202 can be simultaneously performed with the process of forming any one of the pixel electrode 106, the thin-film transistor 101, the data line 105, and the drain line 103, or can be independently performed during the process of forming any one of the pixel electrode 106, the thin-film transistor 101, the data line 105, and the drain line 103.

At step 404, the step is to laminate and assemble the CF substrate 201 and the array substrate 202 together, That is, the first recessed platform 207 and/or the second columnar platform 301 on the CF substrate 201 are aligned with and inserted into the first columnar platform 209 and/or the second recessed platform 302 on the array substrate 202 (engage each other). Specifically, the first columnar platform 209 has a top surface 210, and the first recessed platform 207 has a concave surface 208. An area of the concave surface 208 is larger than an area of the top surface 210, and the top surface 210 of the first columnar platform 209 fits the concave surface 208 of the first recessed platform 207, And/or, the second columnar platform 301 has a top surface 303, and the second recessed platform 302 has a concave surface 305. An area of the concave surface 305 is larger than an area of the top surface 303, and the top surface 303 of the second columnar platform 301 fits the concave surface 305 of the second recessed platform 302.

At step 405, the step is to fill the liquid crystals between the CF substrate 201 and the array substrate 202.

In the present invention, the spacer 102 includes the columnar platform and the recessed platform, and the columnar spacer consists of the columnar platform and the recessed platform that engage each other. Therefore, after the array substrate 202 and the CF substrate 201 that have the columnar platform and the recessed platform disposed thereon are assembled and laminated, the spacer 102 consisting of the columnar platform and the recessed platform is capable of restricting the slide region of the array substrate 202 and the CF substrate 201, thereby preventing the partial region of the LCD panel form sliding and shifting without recovery to decrease the display quality of the LCD panel after the user touches the LCD panel. Meanwhile, the spacer 102 of the present invention consists of two portions, the columnar platform and the recessed platform. The combination of both can increase the elasticity and the resist pressure of the spacer 102.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:
1. A liquid crystal display (LCD) panel, comprising:
an array substrate;
a color filter (CF) substrate disposed opposite to the array substrate; and
a spacer disposed between the array substrate and the CF substrate, the spacer comprising a columnar platform and a recessed platform having a recess portion and a peripheral portion surrounding the recess portion, the columnar platform and the recessed platform engaging each other, wherein the columnar platfatin is inserted into the recess portion of the recessed platform and fits the recess portion, wherein the columnar platform has a surface contacting a surface of the recess portion of the recessed platform and the two surfaces are flat surfaces, and wherein the recessed platform is constructed by a passivation layer, a metal layer, and a semiconductor layer stacked one above another;
the columnar platform disposed on one side of the CF substrate, the recessed platform disposed on one side of the array substrate;
the recessed platform located on a gate line or a data line of the array substrate,
wherein the passivation layer of the recessed platform contacts the semiconductor layer in an area corresponding to the surface of the recess portion of the recessed platform, and the metal layer is formed between the passivation layer and the semiconductor layer to surround the surface of the recess portion of the recessed platform.

2. The LCD panel according to claim 1, wherein the columnar platform is further disposed on the array substrate, and the recessed platform is further disposed on the CF substrate.

3. The LCD panel according to claim 2, wherein the columnar platform is located on a gate line or a data line of the array substrate.

4. The LCD panel according to claim 1, wherein an area of the surface of the recess portion of the recessed platform is larger than an area of the tep surface of the columnar platform.

5. An LCD panel, comprising:
an array substrate;
a CF substrate disposed opposite to the array substrate; and
a spacer disposed between the array substrate and the CF substrate, the spacer comprising a columnar platform and a recessed platform having a recess portion and a peripheral portion surrounding the recess portion, the columnar platform and the recessed platform engaging each other, wherein the columnar platform is inserted into the recess portion of the recessed platform and fits the recess portion, wherein the columnar platform has a surface contacting a surface of the recess portion of the recessed platform and the two surfaces are flat surfaces, and wherein the recessed platform is constructed by a passivation layer, a metal layer, and a semiconductor layer stacked one above another, wherein the passivation layer of the recessed platform contacts the semiconductor layer in an area corresponding to the surface of the recess portion of the recessed platform, and the metal layer is formed between the passivation layer and the semiconductor layer to surround the surface of the recess portion of the recessed platform.

6. The LCD panel according to claim 5, wherein the columnar platform is disposed on one side of the CF substrate, and the recessed platform is disposed on one side of the array substrate.

7. The LCD panel according to claim 6, wherein the recessed platform is located on a gate line or a data line of the array substrate.

* * * * *